United States Patent [19]
Fröderberg

[11] Patent Number: 5,829,578
[45] Date of Patent: Nov. 3, 1998

[54] CONVEYER BELT

[75] Inventor: Ingemar Fröderberg, Höanäs, Sweden

[73] Assignee: Frigoscandia Equipment AB, Helsingborg, Sweden

[21] Appl. No.: 880,860

[22] Filed: Jun. 23, 1997

Related U.S. Application Data

[63] Continuation-in-part of Ser. No. 706,696, Sep. 6, 1996, Pat. No. 5,803,232.

[51] Int. Cl.$^6$ .................................................... B65G 15/54
[52] U.S. Cl. ............................................................ 198/848
[58] Field of Search .................................... 198/778, 848

[56] References Cited

U.S. PATENT DOCUMENTS

| | | | |
|---|---|---|---|
| 1,800,880 | 4/1931 | Woodman | 198/848 |
| 2,674,424 | 4/1954 | Gier, Jr. | 198/848 X |
| 5,423,416 | 6/1995 | Kucharski | 198/848 X |

FOREIGN PATENT DOCUMENTS

| | | | |
|---|---|---|---|
| 1531060 | 8/1969 | Germany | 198/848 |

*Primary Examiner*—James R. Bidwell
*Attorney, Agent, or Firm*—Browdy and Neimark

[57] ABSTRACT

A conveyor belt comprises a plurality of side links at each side of the conveyor belt, a plurality of transverse rods connecting the side links in pairs, and a wire mesh forming a conveying surface of the conveyor belt. The wire mesh further comprises a plurality of wire spirals each spiral having loops encircling two of the transverse rods. At least some of the wire spirals have a varying pitch along the length of the rods.

8 Claims, 1 Drawing Sheet

CONVEYER BELT

CROSS-REFERENCE TO RELATED APPLICATION

The present application is a continuation-in-part of U.S. application Ser. No. 08/706,696, filed Sep. 6, 1996, U.S. Pat. No. 5,803,202 the entire contents of which are hereby incorporated herein by reference.

BACKGROUND OF THE INVENTION

1. Field of the Invention

The present invention relates to a conveyor belt which comprises a plurality of side links at each side of the conveyor belt, a plurality of transverse rods connecting the side links in pairs, and a wire mesh forming a conveying surface of the conveyor belt, said wire mesh comprising a plurality of wire spirals each spiral having loops encircling two transverse rods.

2. Background of the Prior Art

Conveyor belts of this type are used in many belt conveyors, especially in the food industry. They are advantageous for inter alia treating of food products by air in cooling, freezing or cooking the food products.

The conveyor belts may be designed to follow a straight path, a helical path forming a stack of helically wound tiers, or any other path. Normally, separate side links and/or central links joining consecutive transverse rods are used for taking up tractive forces exerted on the conveyor belt so as to move the conveyor belt forward.

However, this known design leads to a concentration of the tractive forces to said links which therefore tend to be relatively bulky. Also, the load on the transverse rods via any central links will inevitably be concentrated and thereby require greater dimensions of these rods than otherwise would be necessary, Also, the resistance of the conveyor belt against an air flow directed vertically through the conveyor belt, varies over the width thereof when the conveyor belt follows a lateral curve, e.g. along a helical path. This is a consequence of an increasing collapse of the wire spirals towards the inner side of the curve and results in a varying cooling, heating or drying of the products carried by the conveyor belt in dependence of their position laterally thereon.

SUMMARY OF THE INVENTION

A main object of the present invention is to provide a conveyor belt which enables an almost arbitrary distribution of the tractive load across the conveyor belt.

A further object of the present invention is to provide a conveyor belt having a resistance against vertical air flow which varies in a predetermined manner across the width of the conveyor belt.

These objects may be attained in that the pitch of each wire spiral is made to vary along the length of the transverse rods.

In many applications, the tractive load should be absorbed at a specific part along the width of the conveyor belt. The present invention satisfies that need by making the pitch of each spiral smaller in that specific part of the conveyor belt than in the rest of the conveyor belt.

Especially, the load should be absorbed at a central part of the conveyor belt or also at several parts across the width of the conveyor belt.

Preferably, the pitch of the wire spiral at that part or parts where the load should be absorbed is made substantially equal to twice the diameter of the wire. This enables a maximum force transfer between two adjacent transverse rods without any component of the force acting in the direction of the transverse rods and thereby tending to displace the wire spiral in that direction.

In order to further guarantee that the traction load forces are absorbed at a desired part, the length of the loops of that part is made smaller in the longitudinal direction of the conveyor belt than the length of the loops of the rest of the conveyor belt in the same direction.

DESCRIPTION OF THE PREFERRED EMBODIMENT

Figure 1:
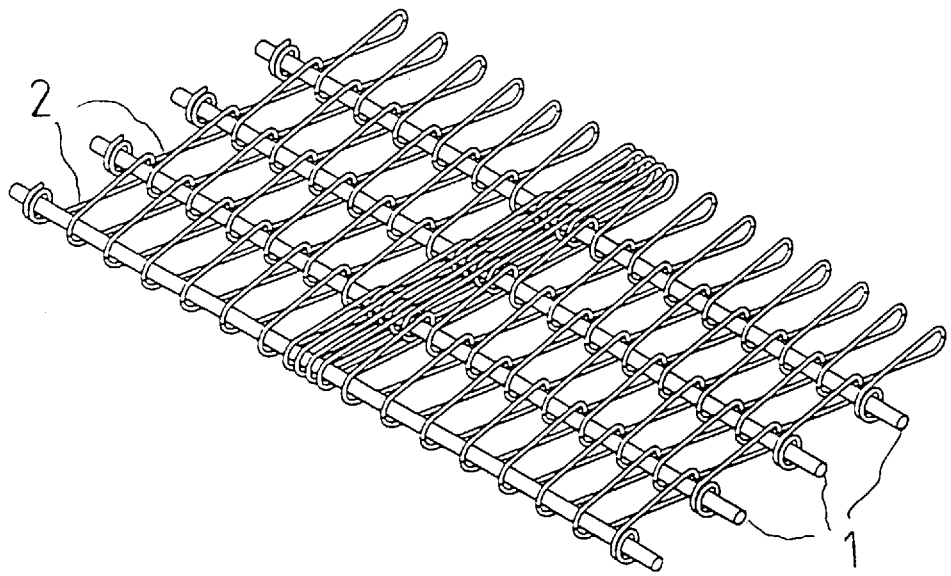
FIG. 1 is a perspective view of a section of a conveyor belt according to an embodiment or the present invention.
Figure 2:
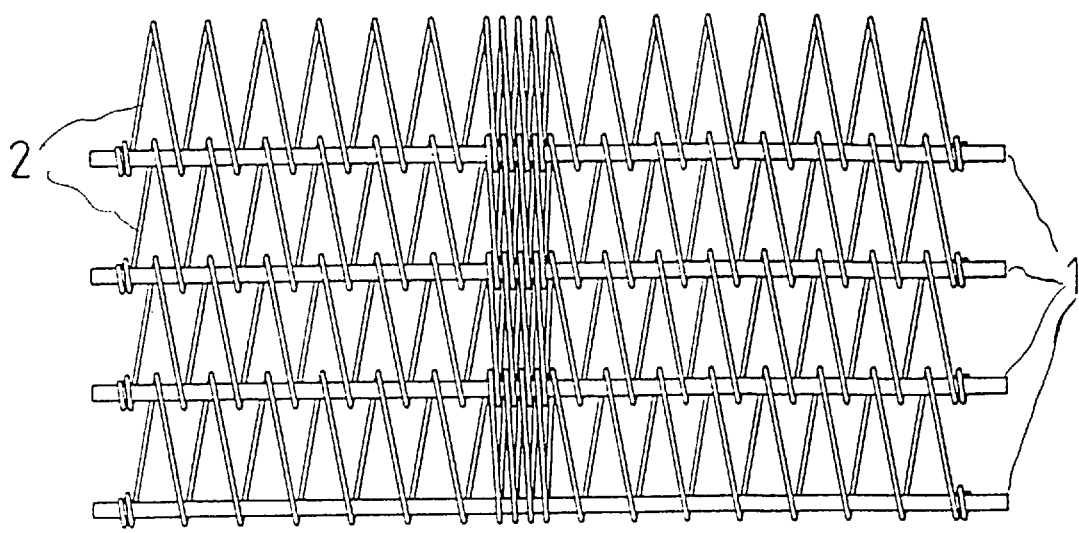
FIG. 2 is a plan view of the conveyor belt section illustrated in FIG. 1.

The conveyor belt embodiment shown in FIGS. 1 and 2 has a plurality of transverse rods 2. The transverse rods are connected to each other by means of side links (not shown), and a plurality of wire spirals 2 are wound around the transverse rods 1.

Each wire spiral 2 has a flattened helical form and is wound around two adjacent transverse rods 1 in one direction. The pitch of each wire spiral 2 is the same across the width of the conveyor belt except for at a central part of the conveyor belt where the wire spiral 2 has a much smaller pitch over four complete loops around the two adjacent transverse rods 1 which are encircled by the wire spiral 2. More precisely, the pitch in this central part is approximately equal to twice the diameter of the wire forming the wire spiral 2. This pitch is the smallest possible pitch when each wire spiral intermeshes with the wire spiral 2 on either side thereof, i.e. when the half-turns of one wire spiral over one transverse rod intermeshes with the half-turns of one adjacent spiral over the same transverse rod.

Obviously, the smaller the pitch of a complete loop of a wire spiral is, the more efficient is that loop in transferring traction forces between the transverse rods encircled, i.e. in the longitudinal direction of the conveyor belt, because the direction of the traction forces almost coincides with this longitudinal direction. This efficiency may be further enhanced by reducing the width of the wire spiral in the longitudinal direction of the conveyor belt, i.e. reducing the length of the loops.

Also, the traction forces when more or less parallel with the longitudinal direction of the conveyor belt, have small components in the direction of the transverse rods tending to displace the turns of the wire spiral along the transverse rods encircled by that wire spiral out of their original positions.

It is to be understood that the pitch of the wire spirals may be varied depending upon the needs in each specific application and, inter alia, may include several parts across the width of the conveyor belt each having a separate, constant pitch, but may also include a continuously varying pitch across the conveyor belt.

Moreover, by varying the pitch of the wire spirals it is possible to provide a desired distribution across the width of the conveyor belt of the resistance towards air flow through the conveyor belt, especially along laterally curved parts of the conveyor belt path.

A variety of modifications of the conveyor belt described above are possible within the scope of the invention as defined in the appended claims.

Thus, where the transverse rods do not need to shift position in the longitudinal direction of the conveyor belt, e.g. in the central part of the conveyor belt, the consecutive loops may be wound in opposite directions around the transverse rods, Also, the loops on one side of said first part of the conveyor belt could increase towards t-he side edge of the conveyor belt.

What is claimed is:

1. A conveyor belt comprising a plurality of side links at each side of the conveyor belt, a plurality of transverse rods connecting the side links in pairs, and a wire mesh forming a conveying surface of the conveyor belt, said wire mesh comprising a plurality of wire spirals each spiral having loops encircling two transverse rods, wherein at least some of said wire spirals have a varying pitch along the length of said rods, wherein the pitch of each spiral is smaller in a first longitudinal part of the conveyor belt than in the rest of the conveyor belt, wherein said first part is a central part of the conveyor belt.

2. A conveyor belt as claimed in claim 1, wherein the pitch of each spiral in said central part is substantially equal to twice the diameter of the wire.

3. A conveyor belt as claimed in claim 1, wherein the length of the loops in said first part is smaller than the length of the loops in the rest of the conveyor belt.

4. A conveyor belt as claimed in claim 1, wherein the length of the loops on one side of said first part increases towards the side edge of the conveyor belt.

5. A conveyor belt as claimed in claim 1, wherein the loops in said first part are wound around the transverse rods in alternating directions.

6. A conveyor belt as claimed in claim 5, wherein all the loops in the rest of the conveyor belt are wound in the same direction around the transverse rods.

7. A conveyor belt as claimed in claim 1, wherein all the loops of the wire mesh are wound in the same direction around the transverse rods.

8. A conveyor belt as claimed in claim 1, wherein said varying pitch increases from one side edge of the conveyor belt to the other side edge of the conveyor belt at least over portions of said transverse rods.

* * * * *